Jan. 27, 1931.  F. W. DAVIS  1,790,620
HYDRAULIC STEERING MECHANISM
Original Filed May 11, 1927   3 Sheets-Sheet 1

Inventor:
Francis W. Davis.
by Wright, Brown, Quinby & May
Attys.

Jan. 27, 1931.                F. W. DAVIS                    1,790,620
                       HYDRAULIC STEERING MECHANISM
                   Original Filed May 11, 1927    3 Sheets-Sheet 2

Inventor:
Francis W. Davis.
Attys.

Jan. 27, 1931.  F. W. DAVIS  1,790,620

HYDRAULIC STEERING MECHANISM

Original Filed May 11, 1927   3 Sheets-Sheet 3

Inventor:
Francis W. Davis.
by Knight Brown Quinby May
attys.

UNITED STATES PATENT OFFICE

FRANCIS W. DAVIS, OF WALTHAM, MASSACHUSETTS

HYDRAULIC STEERING MECHANISM

Continuation of application Serial No. 102,079, filed April 14, 1926. This application filed May 11, 1927.
Serial No. 190,526. Renewed October 2, 1930.

This application is a continuation of my application for Letters Patent on hydraulic steering mechanism for motor vehicles, Serial No. 102,079, filed April 14, 1926, as to all matter common to the two applications. The invention hereinafter disclosed and claimed relates to power devices adapted to augment automatically the force applied at the power input end of a mechanism to overcome excessive resistance at the power output end of the mechanism. An embodiment of the invention may for example be used in cases where it is desired to control manually the position or movement of a ponderous body or one subject to large resistances to its movements. A particular embodiment of the invention is found in a power steering gear of a type suitable for power driven carriers for transporting loads under the manual control of a driver or operator. In such carriers as, for example, an automobile, the direction of movement of the carrier is or should be at all times under constant manual control of the human operator, just as in other carriers, for example an aeroplane, the direction of movement either to one side or the other or up or down is or should be subject to the constant control of the operator. A steering gear of this kind may, according to my invention, be so constructed in an automobile, for example, that the latter will be steered or guided directly by manual power under ordinary conditions of travel on a good road, but if any opposition to the steering deflection of the vehicle wheels is encountered greater than a predetermined amount, the mechanism will automatically and instantly bring fluid power into play to augment the manual effort to overcome the resistance encountered by the vehicle wheels.

In certain branches of the automobile industry there has been a trend during the past few years toward larger and heavier automobiles equipped with an increasing number of accessories adding still further to the total weight. The working parts of an automobile of this type must necessarily be comparatively massive and heavy so that the manual effort required by an operator to steer such an automobile is often great, particularly when maneuvering in traffic at slow speeds. The provision of a satisfactory steering gear for automobiles of the heavier types which could be operated without an exhausting effort on the part of the operator has been a pressing problem in the industry. The problem has been made more acute by the general adoption of the so-called balloon tires which cause a marked increase in the steering resistance of an automobile. In an effort to overcome the difficulty, steering mechanisms have been constructed with a view to eliminating as far as possible the friction between the working parts. While this reduced to some extent the steering resistance of the vehicle, it also gave rise to a still greater evil, that is, a tendency on the part of the steering wheels to "shimmy" or vibrate excessively, with resulting unpleasant vibrations of the car as a whole and harmful stresses on the steering mechanism. Since frictionless joints and connections in the steering mechanism are thus objectionable, the necessity for the use of power to assist the operator becomes the more apparent.

Another factor to be considered in the practical steering of an automobile is the "reversibility" of the mechanism, that is, the transmission of road shocks through the steering mechanism from the vehicle wheels to the steering wheel whereby when a rut or the like tends to deflect the vehicle wheels, the force thus impressed on the wheels is transmitted to the steering wheel, resulting in what is known as "wheel fight". It is obvious that too great a degree of reversibility in a steering mechanism is dangerous since a sudden deflection of the wheels by an obstruction is liable to wrench the steering wheel from the hands of the operator and cause him to lose control of the car. On the other hand, complete irreversibility is objectionable since in such a case all the road shocks and veering tendencies of the vehicle are absorbed by the steering mechanism and the operator loses all the "feel" of the car, which is essential to satisfactory steering. A certain amount of irreversibility has heretofore been obtained by the use of such mechanical devices as a screw and nut, a worm and sector, or a cam and lever. These devices usually result in a comparatively large reduction in motion (or mechanical advantage) between the steering wheel and the vehicle wheels whereby the steering wheel must be turned through a relatively large angle to cause a small deflection of the vehicle wheels. Such reduction of motion is necessary on heavy cars to enable an average operator to steer the car at all, but the excessive turning of the steering wheel which is necessary in turning corners or maneuvering in traffic is highly objectionable and in some circumstances dangerous.

According to the present invention, I supply a steering gear, particularly suitable for automobiles, which is adapted for direct hand steering where the steering resistance is slight, which instantly and automatically augments the manual steering efforts of the operator by the application of power from fluid pressure when the steering resistance exceeds a predeterminable value, and which may be constructed with a degree of reversibility by which the maximum torque which can be impressed on the steering wheel by road shocks is limited to a predetermined value.

Other advantageous features of construction and operations will be apparent to one skilled in the art from the disclosure of the invention in the following description and on the drawings, of which,—

Figures 1, 2, 3, 4, 5:
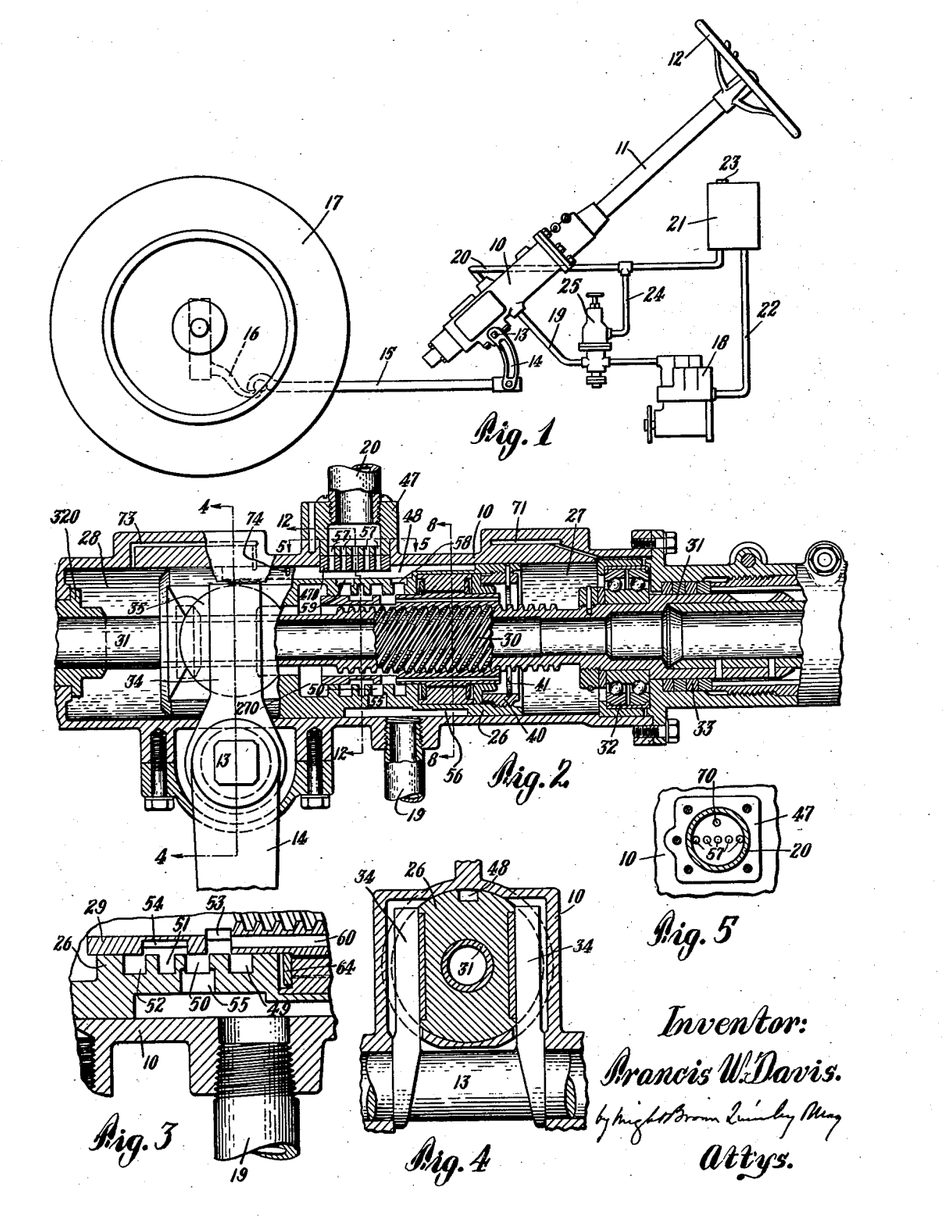

Figure 1 is a diagrammatic showing of an embodiment of my invention as installed in an automobile.

Figure 2 is a side elevation of the power unit, the figure being mostly broken away to show the mechanism in a section on the vertical axial plane.

Figure 3 is a detail of Figure 2 on an enlarged scale.

Figure 4 is a section on the line 4—4 of Figure 2.

Figure 5 is a section on the line 5—5 of Figure 2.

Figure 6:
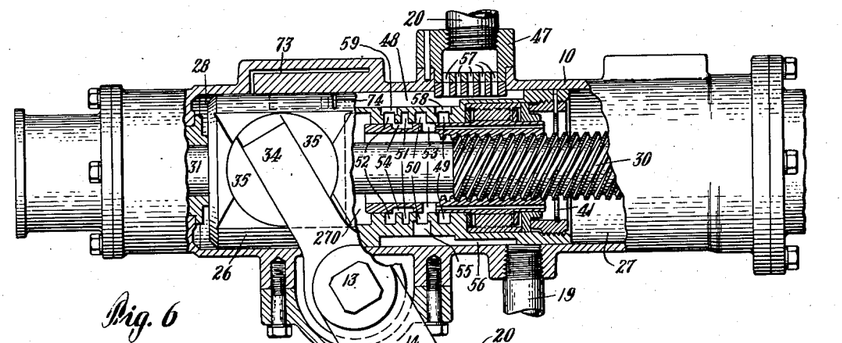
Figures 7, 8, 20:
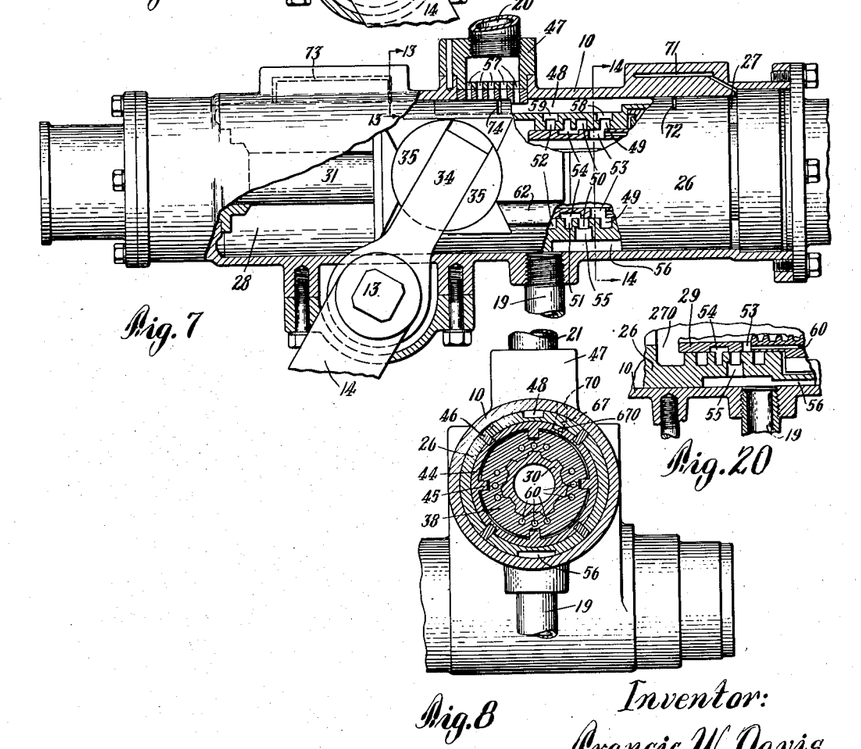

Figures 6 and 7 are side elevations of the power unit, parts of each figure being broken away to show the mechanism in different positions of operation.

Figure 8 is a section on the line 8—8 of Figure 2.

Figure 9:
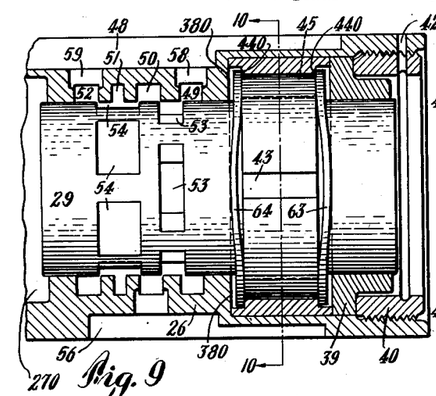

Figure 9 (Sheet 3) is a detail of a portion of the piston and the nut therein, the former being shown in longitudinal section.

Figure 10:
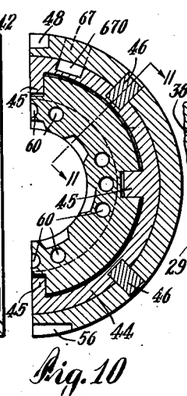

Figure 10 is a section on the line 10—10 of Figure 9.

Figure 11:
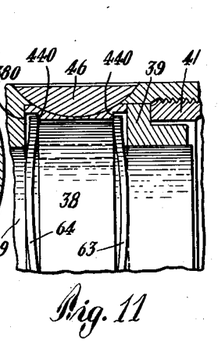

Figure 11 is a section on the line 11—11 of Figure 10.

Figure 12:
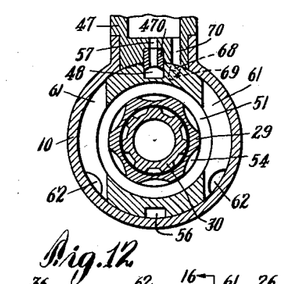

Figure 12 is a section on the line 12—12 of Figure 2.

Figure 13:
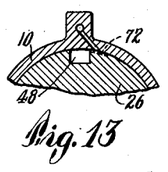

Figure 13 is a fragmentary section on the line 13—13 of Figure 7.

Figure 14:
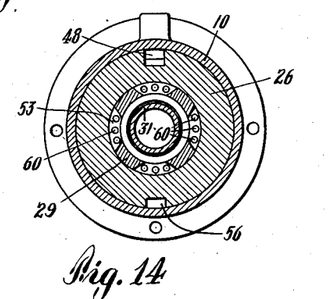

Figure 14 is a section on the line 14—14 of Figure 7.

Figure 15:
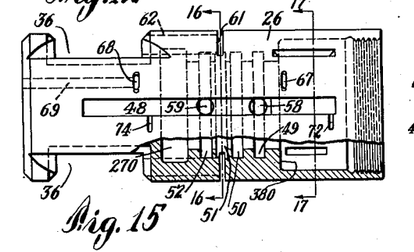

Figure 15 is a plan view of the piston.

Figure 16:
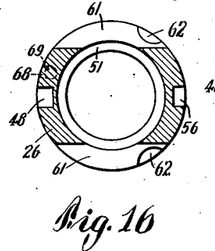
Figure 17:
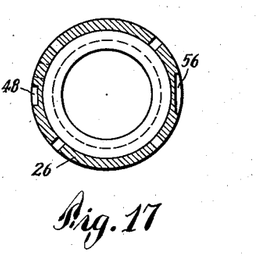

Figures 16 and 17 are sections on the lines 16—16 and 17—17 of Figure 15.

Figure 18:
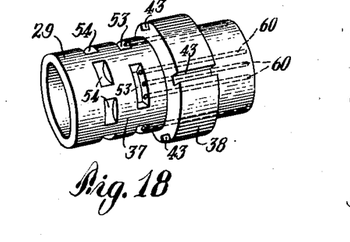

Figure 18 is a perspective of the nut.

Figure 19:
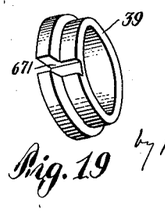

Figure 19 is a perspective of a shouldered collar associated with the piston.

Figure 20 is a fragmentary section of a modified form of the piston and nut resulting in a different type of valve for controlling the power fluid.

Referring to the figures in detail, the power unit as a whole is enclosed in a cylindrical casing 10 which is, as shown in Figure 1, coaxial with the steering column 11 of the automobile in which it is installed. 12 indicates the usual steering wheel. Near the lower end of the casing 10 a cross shaft 13 projects therefrom and to this shaft is fixed a rock arm 14 which may be connected to the usual drag link or reach rod 15 which cooperates with steering arms 16 to deflect the forward wheels 17 of the vehicle, the wheels 17 being rockable on vertical axes to change the direction of motion of the vehicle. The mechanism contained in the casing 10 is designed to be actuated by a stream of fluid, preferably a liquid such as oil or a glycerine mixture, which may be supplied from a suitable pump 18 through a supply pipe 19. The liquid which flows through the casing 10 leaves it as by a discharge pipe 20 which leads to a suitable reservoir or tank 21, this tank being connected to another pipe 22 which leads to the pump 18. The tank 21 is preferably supplied with an opening in the top thereof by which the system may be filled. This opening is covered as by a suitable cap 23 which is preferably made with a small air vent so that the pressure on the surface of the liquid within the tank 21 is normally atmospheric. A by-pass 24 is preferably connected between the pipes 19 and 20, a suitable spring valve 25 being interposed therein, so that if the flow of the liquid through the casing 10 is obstructed, the fluid is permitted to escape through the valve 25 and the by-pass 24 after it has built up a certain pressure which may be predetermined by regulating the spring in the valve 25. The pump 18 may be driven by any preferred means. For example, it may be connected to the cam shaft of the motor which drives the vehicle.

Referring to Figure 2, the casing 10 is formed with a cylindrical bore which contains a piston 26 shown in perspective in Figure 15. The piston is fitted accurately into the bore and forms with the casing a pair of chambers 27 and 28 at its respective ends. Slidably mounted within the piston 26 is a nut 29, shown in perspective in Figure 18. The nut is internally threaded for a portion of its length to receive the threaded portion 30 of the steering post 31 which is connected to the steering wheel 12 and extends downwardly through the column 11 and the cylinder 10, this post being suitably mounted therein as by a set of ball bearings 32 adjacent to the upper end of the cylinder and another bearing member 320 at the lower end of the cylinder. Suitable packing rings 33 may be provided to prevent leakage from the cylinder into the column 11. Other packing rings (not shown) may be provided at the lower end of the cylinder. The nut 29 is permitted a limited sliding motion within the piston, this motion in the form of apparatus herein described being a few thousandths of an inch. The nut 29 and the piston 26 are also held by suitable means against rotation in the cylinder, but are permitted to slide together from one end of the cylinder to the other. The steering of the vehicle is accomplished, in brief, by turning the wheel 12 which rotates the steering post 31. The nut 29 being in threaded engagement with the post 31 and being held against rotation is thereby moved longitudinally in the cylinder, carrying the piston with it. The piston is mechanically connected to the cross shaft 13 by a pair of arms 34 which are rigidly mounted on the shaft 13 and which slide in suitable grooves formed in trunnion blocks 35 which in turn are rockably mounted in suitable recesses 36 adjacent to the lower end of the piston 26. Thus the vehicle may be steered by virtue of the mechanical connection between the steering wheel 12 and the vehicle wheels 17 regardless of the availability of power liquid. The cylinder 10 and column 11 as installed in an automobile will ordinarily be upwardly inclined as in Figure 1. For convenience in describing the mechanism, the portions of the members toward the right as in Figure 2 will be referred to as the upper portions of the members, the portions to the left being referred to as the lower portions.

As shown in Figures 15 and 18, the central and upper portions of the piston 26 are hollow, the central portion having a bore of a size to receive the lower portion 37 of the nut 29, the upper portion of the piston having a larger bore to receive a collar 38 formed on the nut 29, this larger bore forming an interior shoulder 380 in the piston. In order to retain the nut within the piston and to limit its range of sliding movement relative thereto, a suitable ring 39 is inserted into the upper end of the piston after the nut has been inserted to cooperate with and oppose the shoulder 380, this ring being retained in place as by a threaded ring 40. A suitable spring 41 may be provided to pass through an aperture 42 in the ring 40 to lock the same against rotation. The piston and nut may be keyed to each other in any suitable manner to prevent axial rotation of one with respect to the other. As shown in Figure 18, the collar 38 of the nut 29 is provided with a suitable number of slots or keyways 43 to receive corresponding keys 45 carried by the piston. These keys are preferably formed on the inner wall of a sleeve 44 which is fitted within the piston, and are slidable in the slots 43. The sleeve 44 in turn may be keyed to the piston as by a number of suitable keys 46 (Figures 10 and 11). The sleeve 44 is held against longitudinal movement relative to the piston by the clamping action of the ring 39 and the opposing shoulder 380 of the piston. The piston 26 may be held against rotation with respect to the cylinder 10 by the arms 34 which with the trunnion blocks 35 engage against flat faces of the recesses 36 in the sides of the piston. Since, however, the torsional stresses on the piston which may be set up by turning the steering wheel 12 may be sufficiently great to strain the arms 34 and to cause the mechanism to bind or jam, I prefer to provide other means for holding the piston against rotation within the cylinder. To this end, I employ a block 47 which extends through the wall of the cylinder and has a key portion 470 projecting into the cylinder and engaging the sides of a longitudinal groove 48 formed in the external wall of the piston. The key 470 may be made integral with the block 47 or, as shown in Figure 12, it may be a separate piece set into a recess in the block 47 and suitably secured therein.

Having thus described structure by which the vehicle may be steered through a wholly mechanical connection between the steering wheel and the vehicle wheels, I will now describe the features of structure by which fluid power may be brought into play. For this purpose, the piston 26 and nut 29 which, as previously stated, are coaxially mounted for a limited relative sliding movement, one within the other, are provided with annular grooves or passages and cooperate to act as valves to control the action of the power fluid which is admitted into the cylinder. According to the relative position of the piston and nut, the current of power fluid is directed either into chamber 27 or chamber 28, or is allowed to flow through the cylinder maintaining equal pressures in these chambers. When the piston and nut are in a so-called neutral position with respect to each other, the fluid is allowed to flow through the cylinder without disturbing the normal equality of pressure in the chambers 27 and 28. This neutral position of the piston and nut is illustrated in Figures 2 and 3. When, however, the nut is moved relatively to the piston, the fluid flow of the power fluid is so altered as to raise the pressure in one of the chambers 27, 28 and lower it in the other, this difference of pressure being such as to urge the piston in a direction to follow the motion of the nut. If when the nut is stationary, the piston is moved, the valve action will likewise tend to restore the piston to its neutral position with respect to the nut. In order to control the action of the fluid in this manner, the piston may be provided with a series of annular grooves 49, 50, 51, 52 formed in its inner wall. These grooves cooperate with suitable ports 53, 54 formed in the reduced portion 37 of the nut 29. The ports 53 preferably extend all the way through the wall of the nut, thus connecting these ports with a chamber 270 formed within the piston, whereas the ports 54 extend only part way through the wall. The net effective area presented for fluid pressure on the piston toward the left in the chambers 27 and 270 (Figure 2) is equal to the cross-sectional area of the piston minus the cross-sectional area of the portion of the steering post 31 below the threaded portion 30. This is equal to the net effective area presented for fluid pressure on the piston toward the right in the chamber 28. Hence an equality of pressures in the chambers results in balanced opposed forces on the piston. The ports 53, 54 preferably consist of circular series of spaced segments separated by portions of the wall which slide on the inner surface of the piston and prevent the ports 53, 54 from catching on the edges of the grooves 49, 50, 51, 52. As shown in Figure 2, the groove 50 communicates by a suitable perforation or port 55 through the wall of the piston with a longitudinal groove 56 formed in the outer surface of the piston opposite to the groove 48. The groove 56 is of sufficient length to be in constant communication with the supply pipe 19 by which power fluid is led from the pump 18. In like manner, the groove 48 is of sufficient length to be in communication with the discharge pipe 20 for any position of the piston within the cylinder and is in constant communication with the grooves 49 and 52 by suitable ports 58, 59 respectively. The block 47 which, as previously mentioned, serves as a key to prevent rotation of the piston within the cylinder, is hollow and serves also as a fluid connection between the groove 48 and the discharge pipe 20, fluid communication from the groove 48 to the pipe 20 being had as by a row of holes 57. When the piston and nut are in relative neutral position as in Figure 2, power fluid entering through the pipe 19 passes into the groove 56, thence through the port 55 into the groove 50. From this groove it flows through the ports 53 into the groove 49 which communicates with the groove 48 through the port 58. The fluid then leaves the cylinder through the openings 57 and is discharged by the pipe 20. The chamber 27 is constantly connected to the ports 53 as by a series of longitudinal ducts 60. As all of the grooves, ports and chambers within the cylinder are normally filled with the power fluid, which for convenience will be hereinafter referred to as "oil", pressure conditions in the ports 53 will at all times be instantly communicated to the chambers 27 and 270. The ports 54 in like manner are constantly in communication with the chamber 28, being connected therewith by the groove 51 which communicates with a pair of slots 61 cut in the outer wall of the piston and connected by longitudinal grooves 62 to the chamber 28. Pressure conditions of the oil in the ports 54 will therefore be instantly communicated at all times to the chamber 28. The valve action resulting from a relative movement of the piston and nut may now be observed from an inspection of Figures 2 and 3. It should be borne in mind that of the grooves shown in Figure 3, the groove 50 represents the oil supply since it is at all times in communication with the supply pipe 19. The grooves 49 and 52 represent the discharge openings for the oil since these grooves are always in communication with the discharge pipe 20. The ports 53 represent the chamber 27 and the ports 54 represent the chamber 28. Referring to Figure 3, it will be seen that when the piston 26 and the nut 29 are in their neutral relative positions as shown, the oil entering the cylinder through the pipe 19 will pass through the port 55 into the groove 50. From this groove the flow is divided, part of the oil passing through the ports 53 into the discharge groove 49, the rest of the oil passing through the ports 54 into the discharge groove 52. Then when the piston and nut are in the neutral position, there is a divided flow of oil through the ports 53 and 54, the pressures in these ports and hence in the corresponding chambers 27, 28 being equal. If now the nut 29 is moved to the right with respect to the piston 26 (Figure 7), the opening between the ports 53 and the supply groove 50 will be diminished, thus partially or wholly cutting off the supply of oil to the ports 53 and hence to the chamber 27. The opening between the ports 53 and the discharge groove 49 is at the same time enlarged to permit oil to flow from the chamber 27 to the discharge pipe 20. In like manner, the opening between the ports 54 and the supply groove 50 is enlarged, thus permitting a greater flow of the oil into the ports 54 and hence into the chamber 28. At the same time the opening between the ports 54 and the discharge groove 52 is partially or wholly closed, thus obstructing the discharge flow from the ports 54 and tending to build up pressure therein. This built-up pressure, extending to the chamber 28, tends to push the piston to the right, following the direction of movement of the nut. When the piston has thus been moved to follow the nut and to assume again its neutral position relative thereto, the flow of oil through the two branch passages is again restored to the normal balanced flow with equal pressures in the chambers 27, 28. Likewise if the nut is moved toward the left with respect to the piston (Figure 6), the discharge opening of the chamber 28 is enlarged and additional pressure is built up in the chamber 27 so as to push the piston to the left to follow up the motion of the nut until the neutral position is again reached. This valve action caused by relative movement of the nut and piston which disturbs the normally balanced flow of oil through the branch passages results in an extremely sensitive follow-up mechanism which instantly responds to the slightest movement of the nut within the piston. The maximum relative movement of the nut and piston as hereinbefore stated, is only a few thousandths of an inch. It is obvious that should the piston be displaced, while the nut is stationary, the effect of the relative movement of the piston and nut will be as described above and the oil pressures will tend to push the piston back to its neutral position with respect to the nut. The use of the power mechanism in steering a vehicle will now be apparent. Rotation of the steering wheel 12 will, as previously described, cause an axial displacement of the nut which is threaded thereon. Displacement of the nut relative to the piston will cause a power-actuated follow-up motion on the part of the piston. This motion of the piston will be mechanically passed on through the arms 34, the cross shaft 13, the arm 14, and the reach rod 15 to the steering wheels, thus deflecting the latter in accordance with the amount of rotation of the steering wheel 12.

The invention may be more readily understood if reduced to simplest terms. Essentially it comprises a pair of relatively reciprocable cooperating elements such as a cylinder and a piston therein, one of these elements being secured to the carrier, the other element being movable to deflect a part of the carrier by which the direction of motion of the carrier is maintained or changed, as, for example, the forward wheels of an automobile. In the specific embodiment of the invention illustrated on the drawings, the fixed element is the cylinder casing 10, the movable element being the piston 26 which is reciprocable therein. The piston and cylinder together form a pair of opposed pressure chambers in which differential fluid pressures may be employed to move the movable element relatively to the fixed element and thereby to deflect the vehicle wheels. A manually operable control member is provided which is movable with the movable element, this manually operable control member being the nut 29 in the embodiment illustrated. The manually operable control member, in addition to being movable with the movable element, is also movable relatively thereto. The cylinder casing is supplied with an inlet and an outlet to admit and discharge power fluid for the actuation of the movable element. The manually operable member and the movable element are provided with a pair of conduits extending in multiple from the fluid inlet to the fluid outlet, each of these conduits connecting a respective pressure chamber with both the inlet and the outlet. The two conduits are normally open to permit the unobstructed flow of pressure fluid from the inlet to the outlet, but the movable element and the manually operable member are so constructed as to cooperate as controlling valves when relatively moved, their action being to constrict or close the two conduits in such a way as to increase the supply of power fluid to one pressure chamber and at the same time to diminish the supply to the opposite chamber. At the same time the conduit from the first pressure chamber to the fluid outlet is constricted or closed, while the conduit from the opposite chamber to the fluid outlet is opened wider. This disturbs the balance of pressure in the two pressure chambers and tends to move the movable element in a direction to follow up the previous movement of the manually operable member relative thereto.

While the mechanism thus far described is sufficient to effect power steering of a vehicle, it is preferred to employ yielding means tending to hold the piston and nut in their neutral relative position, this yielding means also tending to restore the piston and nut to their neutral position whenever either is displaced therefrom. Such yielding means may be of any preferred type. By way of illustration, two such means are shown on the drawing. Of these one may comprise a pair of spring washers 63, 64 (Figure 9), these washers being located between the end faces of the collar 38 of the nut 29 and the respective opposed faces of the shoulder 380 and the ring 39. These spring washers may be of any strength, stiffness and initial compression according to the steering action desired. When the piston and nut are in neutral position as shown in Figure 9, the springs 63, 64 are held between the adjacent faces of the ring 39 and shoulder 380 respectively, and the adjacent ends of the keys 45, so that in this position they do not press against the collar 38 of the nut, although they may be in contact therewith. If, however, the nut is moved to the right as shown in Figure 9, its collar 38 moves to compress further the washer 63, while the washer 64 is prevented from following the portion 38 of the nut by the adjacent ends of the keys 45 and by one of a pair of shoulders 440 on the sleeve 44. Thus the full compressive force of the washer 63 tends to restore the piston and nut to their neutral position. In like manner, motion of the nut to the left is opposed by the full compressive force of the washer 64 which tends to restore the nut and piston to their neutral position. This feature of the invention is of great practical importance in an automobile steering gear for several reasons. By utilizing washers of sufficient strength and stiffness, the steering of the automobile may be effected by direct mechanical connection between the steering wheel and vehicle wheels under normal conditions of operation where the resistance to steering effort is relatively small, the motion of the steering wheel being transmitted mechanically from the nut to the piston by the washers which are placed between them and oppose relative movement thereof and constitute a yielding link in the mechanical train connecting the steering wheel with the steered part. It is obvious that if the resistance to steering deflection of the vehicle wheels exceeds a certain amount determined by the strength and stiffness of the spring washers 63, 64, one of the latter will thereupon be compressed permitting relative movement between the piston and nut and thus bringing into play the action of fluid power to restore the piston and nut to their neutral position and in so doing to produce the desired steering deflection of the vehicle wheels 17. Hence the steering characteristics of the gear may be determined by the selection of spring washers 63, 64 having the characteristics desired. If, for example, the spring washers be omitted entirely, the manual effort required to turn the steering wheel will amount merely to the frictional resistance of the steering post bearings, and the threaded engagement of the steering post with the nut. In such a case, fluid power would be used for all steering motions. This system would also be practically irreversible, that is, deflecting forces acting on the vehicle wheels by ruts or other obstructions in the road would not be transmitted through the steering gear to the steering wheel 12, but would be entirely absorbed in the power unit since such external deflecting forces would tend to displace the piston and would thus instantly bring into play fluid force to restore the piston to its neutral position without any effect being felt on the steering wheel. If, however, spring washers 63, 64 are inserted as shown, and the pitch of the threaded portion 30 of the steering column is sufficient to transmit forces between the post and the nut in either direction, then external deflecting forces acting on the vehicle wheels and thus causing a movement of the piston will transmit through the spring washers some of this movement to the nut and thus to the steering wheel. The amount of deflecting force thus transmitted back to the steering wheel will be proportional to the stiffness of the spring washers. Hence the latter will determine the amount of "feel" of the steering gear. By using washers which are comparatively stiff and are held under considerable compression between the end faces of the keys 45 and the adjacent faces of the piston 26 and ring 39, it will be seen that ordinary steering will be accomplished by manual power without the use of the fluid power, the latter being brought into play only when the resistance to steering effort exceeds the compressive resistance of the spring washers. The use of the spring washers or other equivalent means tending to maintain the nut and piston in neutral position afford further advantages in addition to providing a "feel" for the steering gear. If, for example, the vehicle is at rest, and particularly if one of the front wheels is in contact with a curbstone, resistance to deflection of the vehicle wheels will be very considerable, so that if the steering wheel is turned under such conditions to displace the nut from neutral position, the steering resistance may be so great that the fluid pressure in the power unit will be insufficient to deflect the vehicle wheels. Hence unless there is some means for restoring the nut to neutral position, the maximum fluid pressure may be maintained for some time in either the chamber 27 or 28, keeping the mechanism under great stress as long as the nut remains displaced from neutral position. This maximum pressure would be determined by the setting of the spring in the by-pass valve 25 which under such circumstances would operate to provide an escape for the fluid in the supply pipe 19. Such a condition might easily be caused by an accidental and unnoticed turning of the steering wheel by a person seated in a vehicle at rest, but with the motor running. If spring washers, however, are used in the apparatus, such an accidental displacement of the nut will be quickly corrected by the action of the washers in returning the nut to neutral position, thereby saving the power unit from great and unnecessary stresses. If the vehicle wheels are so mounted as to be "self righting", the reversible action permitted by the spring washers will enable the vehicle wheels to assist the operator in straightening the direction of the wheels after a corner is turned.

It is sometimes necessary in the operation of a vehicle to turn the steering wheel as far as it will go in one direction or the other. When the steered parts reach their limit of motion, it is obvious that if the nut has been moved further than the limit of motion of the piston, the full fluid pressure will be acting upon the piston in addition to the manual pressure of the operator, which latter may be considerable especially in an emergency, unless means are provided to relieve the pressure at this point. Since the sum of the maximum fluid pressure and the manual force applied to the steering wheel might easily be sufficient to injure the apparatus, I provide suitable relief ports which operate to relieve the fluid pressure whenever the piston reaches its limiting position at either end of its travel. To this end, suitable ports 67, 68 are formed in the wall of the piston (Figure 15), the port 67 extending through the wall from the outside surface to the bore which receives the collar 38 of the nut 29. A suitable groove 670 is formed in the outer wall of the sleeve 44 and a notch 671 is formed in the ring 39, the groove and notch registering with each other and with the port 67 to connect the latter with the chamber 27. The port 68 extends inwardly a sufficient distance to connect with a longitudinal passage 69 which communicates with the chamber 28. The ports 67, 68 are laterally offset from the channel 48 and thus are at no time in communication with the discharge openings 57. A suitable discharge opening 70 is provided in the block 47, this opening being also offset laterally from the openings 57 so as to be in position to register with the port 67 or 68. The latter are longitudinally positioned in such a way that each registers with the opening 70 when the piston reaches its limit of motion in the opposite direction.

During the operation of the fluid power system, it is desirable that all the spaces and voids in the system be completely filled with oil at all times to avoid the cushioning effect which is caused by the presence of an elastic medium such as bubbles of air or vapor. It is practically impossible, however, to prevent small quantities of gas or vapor from finding their way from time to time into the system. These bubbles entering the cylinder 10 tend to accumulate in the chambers 27, 28. In order to clear the cylinder of such bubbles, bleeding ports may be formed in the walls of the cylinder at suitable places with petcocks which can be manipulated to let out air bubbles which accumulate in the cylinder. This method of getting rid of air bubbles is troublesome and wasteful of oil since a certain amount of oil is usually lost in the process of releasing the air. In the present apparatus, I provide means for automatically clearing bubbles of air from the cylinder. Since the cylinder as shown in Figure 1 is normally in a tilted position, it follows that any air or gases which may collect in the chambers 27, 28 will tend to rise to the uppermost right hand corner of these chambers as viewed in Figure 2. Hence I provide suitable channels of relatively small cross section opening from the uppermost point of the chamber 27 and from an arbitrarily selected point in the top of the chamber 28. Referring to Figures 2, 7 and 13, a suitable passage 71 is provided extending from the uppermost corner of the chamber 27 and opening into a narrow groove 72 which extends laterally from the channel 48. In like manner, a passage 73 extends from a point in the top of the channel 28 to a narrow groove 74 extending laterally from the channel 48. The groove 72 is so placed that it registers with the lower end of the passage 71 when the piston is at an arbitrarily selected point between its mid position as shown in Figure 2 and its extreme position to the right as shown in Figure 7. At the moment when the groove 72 registers with the end of the passage 71, the latter is in communication with the discharge channel 48 and at that moment any bubble of air which has collected at the upper end of the chamber 27 opposite the upper orifice of the passage 71 is forced into the passage by oil pressure in the chamber 27 and is swept out through the groove 72 and the channel 48 into the discharge pipe 20. In like manner, when the lower end of the piston 26 reaches the point just above the lower orifice of the passage 73 so that any bubble of air which may be in the chamber 28 is opposite the orifice of the passage 73, the groove 74 at that point registers with the upper orifice of the passage 73 and provides a direct communication through the passage 73 between the chamber 28 and the discharge pipe 20, thus permitting the air to escape therethrough directly into the discharge and to be swept through the pipe 20 to be trapped in the tank 21. The expulsion of air and oil through either air vent will, of course, occur chiefly if not wholly at such times as there is piston-actuating pressure in the corresponding chamber. Since the passages 71 and 73 are of small cross section, the amount of oil which may escape therethrough in the course of sweeping out entrained air bubbles will be negligible and will not noticeably affect the fluid power action on the piston. This automatic air-exhausting feature aids materially in the initial filling of the system with oil or in the replacement of oil in the system. If the system has been drained and the reservoir has been refilled, the apparatus may be used at once, and the air in the cylinder will soon work its way out through the bleeding passages 71, 73, leaving the cylinder thenceforth completely filled with oil.

The valve action arising from the relative motion of the nut and piston as illustrated in Figure 3 and as hereinbefore described may be termed an "open valve" action, since the passage of power fluid through the cylinder is normally unobstructed, the flow being practically continuous except in extreme conditions of operation, and being divided into two branches, which are balanced as long as the steering is by manual effort only, and are unbalanced when steering resistance is sufficient to bring fluid power into play to assist the manual steering effort. I may, however, if desired, use what may be called a "closed valve" system as illustrated in Figure 20. As will be seen from this figure, which shows the nut and piston in neutral position, the supply groove 50 is normally closed by the nut. Motion of the nut to the right will admit fluid into the chamber 28 through the ports 54 while motion of the nut to the left will admit fluid into the chamber 27 through the ports 53. I consider, however, the open valve system preferable to the closed valve system since in the latter case the flow through the cylinder is normally obstructed and the power fluid must be sent through the by-pass valve 25, thus normally maintaining maximum pressure in the supply pipe 19, against which pressure the pump 18 constantly works. The closed valve system is furthermore less sensitive than the open valve system since the nut must move an appreciable amount before communication is open between the supply groove 50 and the ports 53 or 54. Hence there is necessarily a slight lag in the response of the mechanism to the movement of the steering wheel. In the open valve system, however, there is normally very little fluid pressure against which the pump 18 must work as the fluid flows continuously and unobstructedly through the cylinder and back through the tank 21. The building up of pressure in the supply pipe 19 is occasioned only when and to the extent that steering resistance causes the actuation of the piston by fluid power. Hence a marked economy is obtained in the power required to drive the pump 18. Furthermore the open valve system is extremely sensitive and there is no lag in its action. The slightest deviation of the nut from its neutral position instantly unbalances the flow of power fluid through the two parallel branches and at once creates a difference of pressure in the chambers 27, 28 necessary to move the piston to follow the nut.

While the particular embodiment of the invention herein described and illustrated relates to a steering gear for an automobile, the invention may pertain to the steering of carriers of any kind which carry and are directionally guided by a human operator. It should be evident to those skilled in the art that various changes and modifications may be made therein without departing from its spirit or scope as defined by the appended claims.

I claim:—

1. A power steering mechanism including a steering post having a screw threaded portion, a cylinder coaxial therewith, a fluid-actuable piston reciprocable within said cylinder, a nut mounted on said threaded portion and capable of limited longitudinal movement relative to the piston, and means for preventing rotation of said nut and piston relative to said cylinder; said mechanism including fluid control mechanism operable upon relative motion between said piston and nut.

2. A power steering mechanism for a vehicle including a manually rotatable steering member, a piston, means connected with said piston for directing the travel of the vehicle, and means operatively connecting said piston with said steering member, said connecting means comprising a threaded portion on said member, a cylinder coaxial with said member and having said piston slidably fitted therein, and a nut within said piston mounted on said threaded portion and capable of limited motion with respect to said piston.

3. A power steering mechanism for a vehicle including a manually operated steering post, a piston, means connected with said piston for directing the travel of the vehicle, and means operatively connecting said piston with said steering post, said connecting means comprising a threaded portion on said post, a cylinder coaxial with said post and having said piston slidably fitted therein, and a nut within said piston mounted on said threaded portion and capable of limited motion with respect to said piston, said nut and piston having cooperating passages therein for controlling the flow of fluid through said cylinder.

4. In mechanism of the character described, a cylinder, a manually operable screw disposed centrally of the cylinder, a nut mounted on the screw, and a piston mounted on the nut and slidably fitted in the cylinder, said piston and nut having a pair of normally open conduits variable by relative motion between said piston and member to control the movement of fluid through the cylinder to actuate the piston.

5. In a power steering gear, a steered part, a cylinder, a piston fitted within said cylinder for reciprocation therein and mechanically connected to the steered part, a hand operable control member in said cylinder movable as a unit with said piston, said piston and member being also relatively movable and having portions arranged to engage with one another to limit the motion of said member relative to said piston whereby continued motion of the member after its engagement with the piston moves the piston along therewith, said member and piston also having a pair of normally open conduits variable by relative motion between said piston and member to control the flow of working fluid passing through said cylinder to cause the piston to follow the member when the latter is moved from its normal position relative to the piston.

6. In a power steering gear, a steered part, a hand-operable steering post having a threaded portion, a cylinder mounted coaxially with said post, a piston reciprocable in said cylinder and mechanically connected to the steered part, a nut mounted on the threaded portion of the post, said nut and piston having portions arranged to engage with one another to limit the motion of the nut relative to the piston whereby continued motion of the nut after its engagement with the piston moves the piston along therewith, said nut and piston also having a pair of normally open conduits variable by relative motion between said piston and member to control the flow of working fluid passing through said cylinder to cause the piston to follow the nut when the latter is moved from its normal position relative to the piston.

7. Apparatus for augmenting manual guiding effort, comprising a part to be moved, a cylinder having fluid supply and discharge ports, a piston fitted for reciprocation within said cylinder and mechanically connected to the part to be moved, the ends of said piston forming with the walls of the cylinder a pair of opposed chambers, and a hand-operable member positioned coaxially with said piston for limited longitudinal movement relative thereto, said piston and member having ports and passages cooperating to form a pair of conduits arranged in multiple, each conduit normally connecting the supply port with the exhaust port and with one of said chambers, said piston and member having portions arranged to operate as valves to close off one said conduit when the member is moved relatively to the piston in one direction and to close off the other said conduit when the member is moved in the other direction relatively to the piston.

8. In a power steering gear, a steered part, a cylinder having fluid supply and discharge ports, a piston fitted for reciprocation within said cylinder and mechanically connected to the steered part, the ends of said piston forming with the walls of the cylinder a pair of opposed chambers, a hand operated member positioned coaxially with said piston for limited longitudinal movement relative thereto, said piston and member having ports and passages cooperating to form a pair of conduits arranged in multiple, each channel normally connecting the supply port with the discharge port and with one of said chambers, said piston and member having portions arranged to operate as valves to close off one said conduit when the member is moved relatively to the piston in one direction and to close off the other said conduit when the member is moved in the other direction relatively to the piston, and hand-operable means for moving said member.

9. A power steering mechanism for a self-propelled carrier comprising a housing, a fluid-actuable driven member within said housing, said driven member forming with said housing a pair of opposed chambers, steering connections to said driven member, and a manually movable valve member adapted to be moved in one direction or the other by the operator of said carrier; said steering mechanism including a fluid circulating system, valve mechanism in said system comprising elements movable with said driven member and cooperating elements movable with said valve member, and means for producing a continuous flow of fluid through said system; said fluid circulating system including a supply passage to said valve mechanism, a discharge passage therefrom, and a pair of normally open passages arranged in multiple between said supply and discharge passages, each of said pair of passages communicating respectively with one of said chambers; said valve mechanism being arranged to control the pressures of the fluid flowing in said pair of passages.

10. A power steering mechanism for a self-propelled carrier comprising a cylinder, a fluid-actuable piston and a valve member within said cylinder, adapted to be moved in one direction or the other by manual effort by the operator of said carrier, said piston forming with said cylinder a pair of opposed chambers, a fluid circulating system including a supply passage to and a discharge passage from said cylinder, a pair of normally open passages arranged in multiple between said supply and discharge passages, each of said pair of passages communicating respectively with one of said chambers, and means for producing a continuous flow of fluid through said system; said steering mechanism including valve mechanism in said cylinder comprising elements movable with said piston and cooperating elements movable with said valve member for controlling the relative pressures of the fluid flowing in said pair of passages.

11. A power steering mechanism for a self-propelled carrier, comprising a cylinder, a fluid-actuable piston within said cylinder, said piston forming with said cylinder a pair of opposed chambers, a member rockable to change the direction of motion of said carrier and operatively connected with said piston, a valve member, a hand operable control member operatively connected with said valve member and adapted to be moved in one direction or the other by the operator of the carrier, a fluid circulating system including a supply passage to and a discharge passage from said cylinder, a pair of normally open passages arranged in multiple between said supply and discharge passages, each of said pair of passages communicating respectively with one of said chambers, and means for producing a continuous flow of fluid through said system; said piston and valve member having cooperating valve forming elements for controlling the relative pressures of the fluid flowing in said pair of passages.

12. A power steering mechanism for a self-propelled carrier comprising a cylinder, a fluid-actuable piston within said cylinder, said piston forming with said cylinder a pair of opposed chambers, a member rockable to change the direction of motion of said carrier and operatively connected with said piston, a valve member within said cylinder, a hand operable control member operatively connected with said valve member and adapted to be moved in one direction or the other by the operator of said carrier, a fluid circulating system including a supply passage to and a discharge passage from said cylinder, a pair of normally open passages arranged in multiple between said supply and discharge passages, each of said pair of passages communicating respectively with one of said chambers, and means for producing a continuous flow of fluid in said system; said piston and member having cooperating ports therein forming valve mechanism in said system for controlling the relative pressure of the fluid flowing in said pair of passages.

13. A power steering mechanism for a self-propelled carrier comprising a housing, a fluid-actuable driven member within said housing forming therewith a pair of opposed chambers, a member rockable to change the direction of motion of said carrier and operatively connected with said driven member, a fluid circulating system including a supply passage to and a discharge passage from said housing, a pair of normally open passages arranged in multiple between said supply and discharge passages, and a connecting duct extending from each of said pair of passages to a corresponding chamber; said steering mechanism including valve mechanism in said pair of passages operable to simultaneously close either of said pair of passages at a point before the juncture of the passage with its said connecting duct and the other of said pair of passages at a point beyond the juncture of the passage with its connecting duct, and a hand operated control member operatively connected with said valve mechanism.

14. Mechanism for guiding a self-propelled carrier comprising a fluid circulating system having a pair of pressure chambers, a fluid inlet, a fluid outlet, and a pair of passages extending in multiple from said fluid inlet to said fluid outlet, each said passage communicating with a respective chamber, said mechanism also including valve means forming a pair of variable supply ports between said fluid inlet and passages, and a pair of variable discharge ports between said passages and fluid outlet, the ports of each pair being normally equal but simultaneously and oppositely variable whereby pressure differences between said chambers may be set up and controlled, a member rockable in response to pressure differences in said chambers to change the direction of motion of said carrier, and a hand operated control member operatively connected with said valve means.

15. A power steering gear, comprising a hand-operable steering post, a steered part, a cylinder, a piston reciprocable in said cylinder and forming therewith a pair of opposed pressure chambers, means mechanically connecting said piston to the steered part, a valve slide movable relatively to the piston, means mechanically connecting said valve slide with said post, cooperating stops on said valve slide and piston for limiting the travel of the valve slide relative to the piston, spring means associated with said stops tending to maintain said member in normal intermediate position relative to said piston, said member and piston having cooperating ports and passages forming a pair of conduits each communicating with a respective pressure chamber, said conduits being arranged in multiple for a divided flow of working fluid through the cylinder under similar pressure conditions when the slide is in said intermediate position, said piston and member also forming a series of valves operable by relative movement thereof to control the fluid pressures in said conduits.

16. A power steering gear comprising a steering post, a cylinder, a fluid-operated follow-up mechanism within said cylinder, said mechanism having one member movable by actuation of said post, and a piston member movable directly by the working fluid and connected mechanically to the steered part, said cylinder and piston forming a pair of opposed pressure chambers, said members having a pair of passages therein, each communicating with a respective chamber and permitting a normally continuous flow of fluid through the cylinder, supply and discharge pipes communicating with the cylinder, means for supplying fluid under pressure to said supply pipe, and a by-pass connecting said pipes having a safety valve therein.

17. A power steering mechanism comprising a hand-operable steering post, a steered part, a cylinder coaxial with said post, and power-actuated follow-up mechanism operatively connecting said steering post with said steered part, said follow-up mechanism including a member reciprocable within said cylinder along the axis thereof by movement of said steering post, and a piston fitted in said cylinder for reciprocation along the axis thereof and power-actuated to follow the movements of said member, said piston being operatively connected to said steered part.

18. In a power-actuated follow-up mechanism, a cylinder, a piston reciprocable in said cylinder, the ends of the piston forming with said cylinder a pair of opposed pressure chambers, a manually operable control member, and valve means operable by said control member for varying the relative fluid pressures in said chambers, said mechanism being provided with normally discontinuous relief passages in the parts thereof independent of said control member, said passages having orifices arranged to register to provide a continuous relief passage when and only when the piston reaches an end of its stroke.

19. In a power-actuated follow-up mechanism, a cylinder having a fluid exhaust port, a piston reciprocable in said cylinder, the ends of the piston forming with the cylinder a pair of opposed fluid pressure chambers, and means for varying relative fluid pressure in said chambers to cause said piston to move in said cylinder; said piston having therein a relief passage with one end opening into one of said chambers and the other end having an orifice opening through the side wall of said piston and normally closed by the adjacent inner surface of said cylinder, said orifice being so located as to register with said exhaust port to relieve the pressure in the chamber connected therewith when the piston reaches the limit of its stroke at the end of the cylinder remote from said chamber.

20. In a power steering gear for a self-propelled carrier having a steered part, a cylinder member, a piston member fitted within said cylinder member and forming therewith a pair of opposed pressure chambers, one of said members being stationary, the other said member being reciprocable relative thereto, means for anchoring said stationary member to said carrier, means for mechanically connecting the other and movable member to said steered part, a hand operable control element movable as a unit with said movable member, said element and movable member being also relatively movable and having portions arranged to engage with one another to limit the motion of said element relative to said movable member, whereby continued motion of said element after its engagement with said movable member moves said movable member along therewith, said element and movable member also having a pair of normally open conduits therein variable by relative movement between said element and movable member to control the flow of working fluid passing through said cylinder to cause said movable member to follow said element when the latter is moved from its normal position relative to said movable member.

21. A power steering mechanism for a self-propelled carrier, comprising a housing member, a second member fitted within said housing member and forming therewith a pair of opposed pressure chambers, one of said members being stationary, the other of said members being movable relative to said stationary member, steering connections to said movable member, and a manually movable valve member adapted to be moved in one direction or the other by the operator of said carrier; said steering mechanism including a fluid circulating system, valve mechanism in said system comprising elements movable with said movable member and cooperating elements movable with said valve member, and means for producing a continuous flow of fluid through said system; said fluid circulating system including a supply passage to said valve mechanism, a discharge passage therefrom, and a pair of normally open passages arranged in multiple between said supply and discharge passages, each of said pair of passages communicating, respectively, with one of said chambers; said valve mechanism being arranged to control the pressures of the fluid flowing in said pair of passages.

22. A power steering mechanism for a self-propelled carrier having a steered part rockable to change the direction of motion of the carrier, comprising a cylinder member, a piston member within said cylinder member forming therewith a pair of opposed pressure chambers, one of said members being stationary with respect to the carrier, the other said member being movable by a fluid pressure in said chambers and being operatively connected with said steered part, a valve member, a hand operable control member operatively connected with said valve member and adapted to be moved in one direction or the other by the operator of the carrier, a fluid circulating system including a supply passage to and a discharge passage from said cylinder member, a pair of normally open passages arranged in multiple between said supply and discharge passages, each of said pair of passages communicating, respectively, with one of said chambers, and means for producing a continuous flow of fluid through said system; said movable member and said valve member having cooperating valve forming elements for controlling the relative pressures of the fluid flowing in said pair of passages.

23. A power steering mechanism for a self-propelled carrier having a steered part rockable to change the direction of motion of said carrier, comprising a housing member, a second member within said housing member forming therewith a pair of opposed chambers, one of said members being stationary with respect to the carrier, the other member being movable by fluid pressure in said chambers and being operatively connected with said steered part, a fluid circulating system including a supply passage to and a discharge passage from said housing member, a pair of normally open passages arranged in multiple between said supply and discharge passages, and a connecting duct extending from each of said pair of passages to a corresponding chamber, said steering mechanism including a valve mechanism in said pair of passages operable to simultaneously close either of said passages at a point before the juncture of the passage with its said connecting duct and the other of said pair of passages at a point beyond the juncture of the passage with its connecting duct, and a hand operable control member operatively connected with said valve mechanism.

24. A power steering gear comprising a steering post, a cylinder member, a piston member within said cylinder member forming therewith a pair of opposed chambers, one of said members being stationary, the other member being movable and connected mechanically to the steered part, a fluid operated follow-up mechanism, said mechanism including a control element movable by actuation of said post and said movable member, said movable member and control element having a pair of passages therein each communicating with a respective chamber and permitting a normally continuous flow of fluid through the cylinder member, supply and discharge pipes communicating with said cylinder member, means for supplying fluid under pressure to said supply pipe and a by-pass connecting said pipes having a safety valve therein.

25. A mechanism for guiding a self-propelled carrier, comprising a fluid circulating system having a pair of pressure chambers, a fluid inlet, a fluid outlet, a pair of passages extending in multiple from said fluid inlet to said fluid outlet, each said passage communicating with a respective chamber, said mechanism also including valve means forming a pair of variable supply ports between said fluid inlet and said passages, a pair of variable discharge ports between said passage and said fluid outlet, the ports of each pair being normally equal but simultaneously and oppositely variable whereby pressure differences between said chambers may be set up and controlled, a member rockable in response to pressure differences in said chambers to change the direction of motion of said carrier, a hand-operated control member operatively connected with said valve means, a by-pass between said fluid inlet and fluid outlet, and a relief valve in said by-pass.

In testimony whereof I have affixed my signature.

FRANCIS W. DAVIS.